(12) United States Patent
Cartes et al.

(10) Patent No.: US 9,608,884 B2
(45) Date of Patent: Mar. 28, 2017

(54) SYSTEM AND METHOD FOR REMOTE MANAGEMENT OF A COMPUTER

(75) Inventors: Andrew C. Cartes, Cypress, TX (US); Christopher J. Frantz, Houston, TX (US); Michael B. Reed, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1621 days.

(21) Appl. No.: 12/082,737

(22) Filed: Apr. 14, 2008

(65) Prior Publication Data

US 2009/0259739 A1    Oct. 15, 2009

(51) Int. Cl.
*G06F 15/16* (2006.01)
*H04L 12/26* (2006.01)
*H04L 12/24* (2006.01)

(52) U.S. Cl.
CPC ...... *H04L 43/0811* (2013.01); *H04L 43/0817* (2013.01); *H04L 41/06* (2013.01)

(58) Field of Classification Search
CPC .. H04L 65/1069; H04L 65/1006; G06F 15/16
USPC ....................................................... 709/227
See application file for complete search history.

(56) References Cited

U.S. PATENT DOCUMENTS

| 5,809,251 | A | * | 9/1998 | May et al. ..................... 709/223 |
| 5,862,253 | A | * | 1/1999 | Schuneman et al. ......... 382/162 |
| 5,956,712 | A | * | 9/1999 | Bennett et al. |
| 6,094,654 | A | * | 7/2000 | Van Huben et al. |
| 6,151,684 | A | * | 11/2000 | Alexander et al. ................ 714/4 |
| 6,233,702 | B1 | * | 5/2001 | Horst et al. ...................... 714/48 |
| 6,330,560 | B1 | * | 12/2001 | Harrison et al. .............. 709/223 |
| 6,631,407 | B1 | * | 10/2003 | Mukaiyama et al. ......... 709/223 |
| 6,664,969 | B1 | * | 12/2003 | Emerson et al. .............. 345/544 |
| 6,976,159 | B1 | | 12/2005 | Poduska |
| 7,035,857 | B2 | | 4/2006 | Reeves |
| 2001/0042202 | A1 | * | 11/2001 | Horvath et al. ............... 713/154 |
| 2003/0131136 | A1 | | 7/2003 | Emerson |
| 2005/0193118 | A1 | * | 9/2005 | Le et al. ........................ 709/227 |
| 2006/0190238 | A1 | | 8/2006 | Autor |
| 2007/0055780 | A1 | | 3/2007 | Cartes |
| 2007/0123216 | A1 | * | 5/2007 | Cantini et al. ................. 455/411 |
| 2007/0290797 | A1 | * | 12/2007 | Harkins et al. .............. 340/5.73 |
| 2008/0126836 | A1 | * | 5/2008 | DiZoglio et al. .................. 714/4 |
| 2009/0265463 | A1 | * | 10/2009 | Greifeneder et al. ......... 709/224 |

OTHER PUBLICATIONS

"SNMP Agent Administrators Guide", Apr. 1997, HP, Edition 1, 1-65.*
Scaraone "User's Guide to Securing External devices for Telework and Remote Access", May 2007, Computer Science Division Information Technology Laboratory, All Pages.*

(Continued)

*Primary Examiner* — Ranodhi Serrao
(74) *Attorney, Agent, or Firm* — Fletcher Yoder (57) ABSTRACT

There is provided a system and method for remote management of a computer. The method includes establishing a connection between a remote console and a managed server. Additionally, the method includes detecting a change in the status of the connection and issuing commands to lock the managed server if a change in status of the connection is detected.

25 Claims, 4 Drawing Sheets

(56) References Cited

OTHER PUBLICATIONS

Remotely AnyWhere (LogMeIn RemotelyAnywhere User Guide), LogMeIN, Inc, Apr. 2007, All Pages.*
"Enable Automatic Screen Lock Group Policy", May 30, 2006, Windows Vista Tips, http://www.winvistatips.com/enable-automatic-screen-lock-group-policy-t763603.html, All Pages.*

* cited by examiner

SYSTEM AND METHOD FOR REMOTE MANAGEMENT OF A COMPUTER

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Over the past several decades, computers have become increasingly important tools in all aspects of modern society. The computers used in businesses, schools and homes may be networked together via servers. The servers may be configured to provide services including applications and/or storage resources. Additionally, the servers may provide access to other computers or networks. As such, the server is a central feature in today's networked computer environment and the proper operation of the network depends on the proper operation of the servers.

In order to facilitate continuous operation of servers and to reduce downtime, the servers may be remotely managed. Specifically, the servers may be configured to allow for a remotely located user to access the server for remotely analyzing and servicing the server. This remote access helps control network management costs by reducing the number of network management personnel required to maintain the network, as well as reduces the delay and expense of analyzing and repairing network problems. For example, a network management team may identify issues and, in some cases, solve those issues without an on-site service call to the server.

During a remote management session, however, the server may become vulnerable. A user located at the server may gain access to the server via a local console following login by a remote manager. The local user may then take over the operating system control using local I/O controls such as the keyboard and prevent further remote management by disconnecting the network connection which allows for the remote management. Thus, the local user effectively hijacks the server once the local console has been unlocked by the remote manager.

Previous attempts to prevent a local user from hijacking the server during remote management sessions include disabling local controls such as USB ports by inhibiting device support in the operating system or disabling the hardware in system ROM-based system utilities (RBSU). Alternatively, local controls, such as PS/2 ports, have been disconnected when the remote console is in use. This was implemented by using multiplexed connection and external tri-state control signals to inhibit simultaneous parallel connection on the point-to-point PS/2 or serial connections. These solutions, however, required disabling local support unless the system is rebooted and/or reconfigured.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To prevent an unauthorized user at a local console from hijacking a remotely managed computer system, a method and system for locking the local console in the event a remote management connection is lost, abandoned, or disconnected, is provided. The method includes activating a management trap, such as a command to lock the local console by activating an operating system mechanism, for example, in the event the remote management connection is lost. Management traps are generally hardware signals that are received by an operating system. All of the traps discussed herein are notifications to the operating system that the local console should be secured. As will be discussed in greater detail below, the notifications are sent by a management processor in response to the loss of remote control and, in general, all of the notifications are made by simulating various user actions using virtual devices.

For example, notification may be made by simulating user actions on a virtual keyboard. The use of keyboard buttons to send signals to the operating system falls into a class of traps referred to as "keyboard shortcuts." The keyboard shortcuts class of traps may include user commands to lock the operating system, such as the "windows key"+"L" key, for example. Once the operating system is locked, credentials, such as a username and/or password, for example, may be required to unlock the operating system. Another example of a keyboard shortcut includes the simultaneous pressing of Ctrl+Alt+Del buttons to shut-down or interrupt the operation of the operating system.

In another alternative embodiment, the management traps may be implemented as mouse-based operations such as "click start" or "click lock console". In yet another alternative embodiment, the management trap may be implemented as "disconnect smart card" for systems using token-based authentication. Many of the techniques disclosed herein may be implemented without supplemental on-board software or drivers.

In an alternative embodiment, the management traps may also include other methods, such as notification to the operating system via an application that is contacted by the management processor. Such an application could respond to a "disconnect assertion" indicating a disconnection event or to a "timeout" which indicates that remote connection cannot be verified by providing notification that the console should be secured.

An application-based notification has the ability to trigger events beyond those for which standard keyboard based notifications are capable. For example, an application trap could activate a screen saver that in turn may be configured to secure the server console. Specifically, the application-based notification may include activating a screen saver which may require a password and/or username to deactivate the screen saver for continued use of the system, as will be discussed in greater detail below. The screen saver notification may require additional software and possibly cost.

Figure 1:
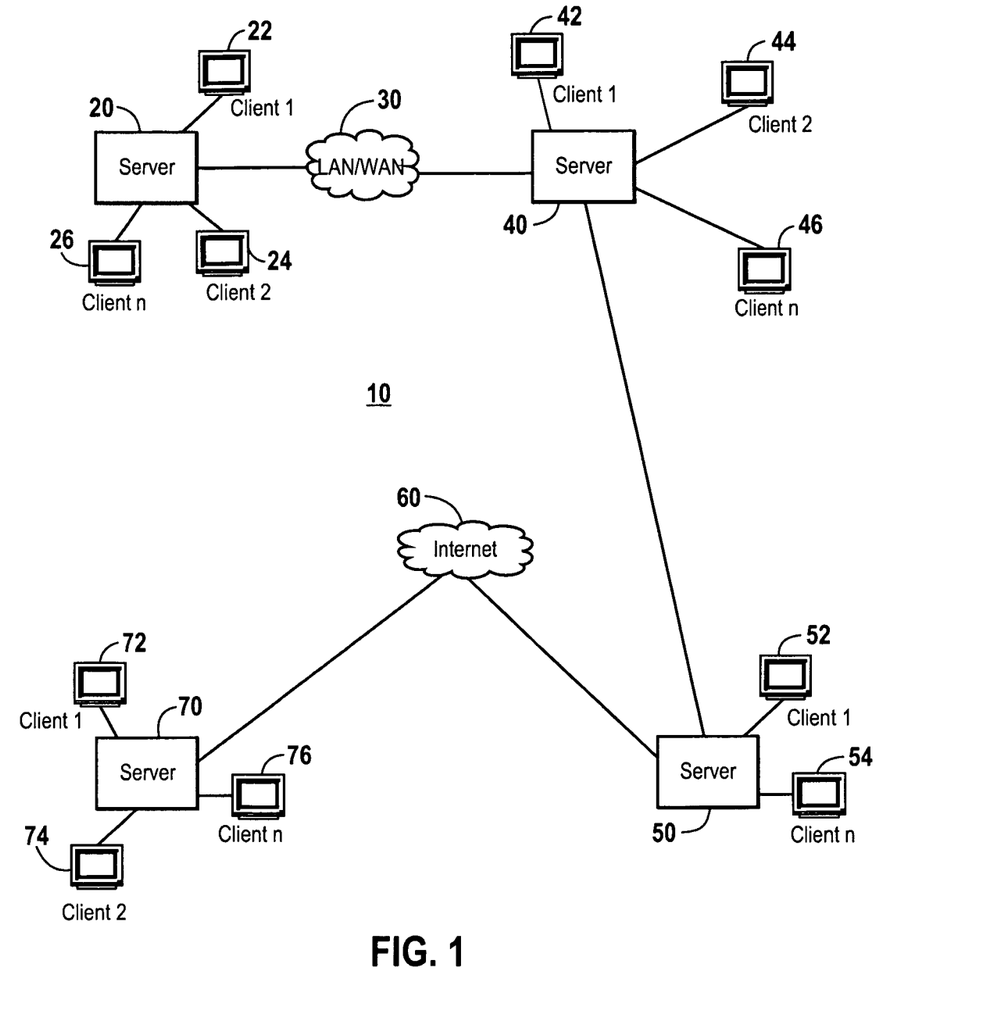
FIG. 1 illustrates a network having a managed server in accordance of an exemplary embodiment of the present invention.

Turning now to the drawings and referring initially to FIG. 1, a block diagram of an exemplary computer network system in which the present invention may be practiced is illustrated and generally referred to by the reference numeral 10. The computer network 10 is intended to illustrate a typical modern computer network configuration. The network topology shown in FIG. 1 is given as an example and shown only to explain the present invention with greater clarity by providing an example of a network environment in which the present invention is useful. As such, topologies and protocols other than that of the network illustrated in FIG. 1 may be implemented. For example, the network may be an Ethernet network, a Gigabit network, a wireless network, and so forth.

As illustrated, a managed server 20 is connected to a plurality of client computers 22, 24 and 26. The managed server 20 may be connected to as many as n different client computers. The magnitude of n is a function of the computing power of the managed server 20. If the managed server 20 has a relative large amount of computing power (for example, faster processor(s) and/or more system memory) compared to other servers on the network 10, it will be able to effectively serve a relatively large number of client computers.

The managed server 20 is also connected to a network infrastructure 30, which may consist of any combination of hubs, switches, routers and the like. While the network infrastructure 30 is illustrated as being either a local area network ("LAN") or wide area network ("WAN"), those skilled in the art will appreciate that the network infrastructure 30 may assume other forms such as the Internet or a municipal area network ("MAN").

The network infrastructure 30 connects the managed server 20 to server 40, which is representative of another server in the network environment of managed server 20. The server 40 may be connected to a plurality of client computers 42, 44 and 46. The server 40 is additionally connected to server 50, which is coupled to client computers 52 and 54. The number of client computers coupled to the servers 40 and 50 is dependent only on the computing power of the servers 40 and 50, respectively.

The server 40 is additionally connected to the Internet 60 to which a server 70 is coupled. Server 70 is also connected to a plurality of client computers 72, 74 and 76. As with the other servers shown in FIG. 1, server 70 may be connected to as many client computers as its computing power will allow.

For purposes of this discussion, only one server on the network 10 has been designated as a "managed server" 20. In practice, however, any or all of the servers in the network 10 could simultaneously include hardware and software devised to allow those servers to operate as "managed servers" as well. Additionally, the managed server 20 may be any of a variety of processing devices. For instance, the managed server 20 may be Hewlett-Packard computer systems or servers. However, the principles discussed herein are believed to be equally applicable to other system platforms or architectures, such as those manufactured by Apple, Sun, and/or International Business Machines ("IBM"). Moreover, the managed server 20 could be of a particular architecture while a system used to remotely access the managed server 20 could be of another architecture. For example, the managed server 20 may be an x86 architecture computer running Microsoft Windows NT OS, and a client n 76 could be a Sun workstation running Solaris OS.

Figure 2:
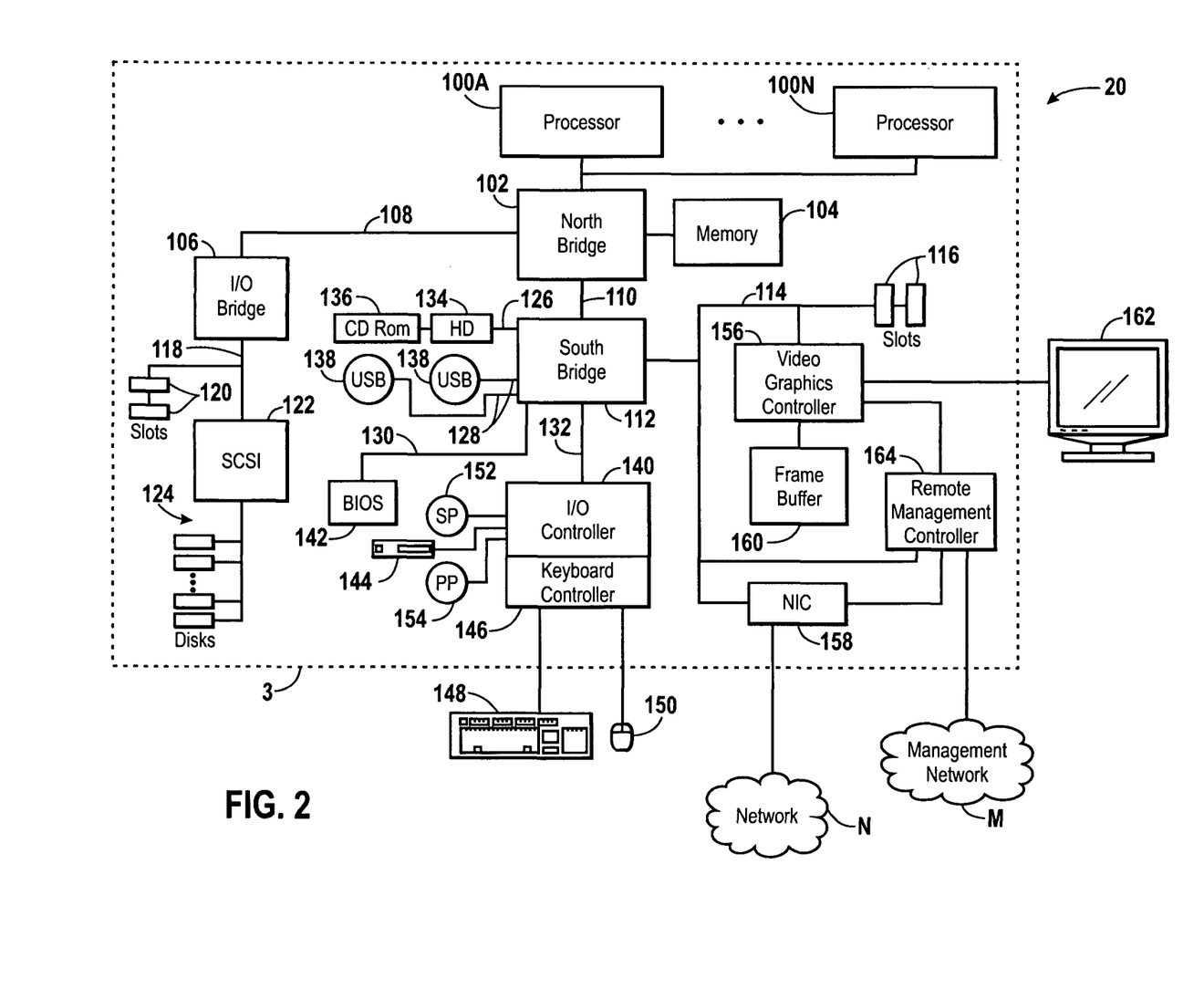
FIG. 2 is a block diagram of the managed server of FIG. 1 in accordance with an exemplary embodiment of the present invention.

In FIG. 2, a block diagram of an exemplary embodiment of the managed server 20 of FIG. 1 is illustrated in accordance with an exemplary embodiment of the present invention. To provide processing power, the managed server 20 includes one or more processor 100A-100N, which are herein referenced as processor 100. For example, the processor 100 may be Pentium processors or other processors manufactured by Intel Corporation. Each of the processor 100 may operate applications and other programs, which may influence the video images presented from the managed server 20.

The processor 100 may be coupled to a north bridge 102. The north bridge 102 may include a memory controller for accessing a main memory 104 (e.g., synchronous dynamic random access memory ("SDRAM"). The north bridge 102 may be coupled to one or more I/O bridges 106 by a bus 108, such as a fast I/O bus. The north bridge 102 also may be coupled via an I/O link 110 to a south bridge 112 which is coupled to a bus 114, such as a PCI or a PCI-X bus. The bus 114 may also be coupled to one or more slots 116 for receiving expansion cards.

The I/O bridge 106 may provide bridging for one or more expansion busses 118, such as additional PCI or PCI-X buses, for example, which may be coupled to various peripheral devices. In this example, the bus 118 is coupled to I/O slots 120 and to a SCSI controller 122, which, in turn, is coupled to a plurality of disk drives 124.

The south bridge 112 may be an integrated multifunctional component, that may include a number of functions, such as, an enhanced direct memory access ("DMA") controller; interrupt controller; timer; integrated drive electronics ("IDE") controller for providing an IDE bus 126; a universal serial bus ("USB") host controller for providing a universal serial bus 128; a system read only memory (ROM) interface 130; a bus controller for providing a low pin count bus ("LPC") 132; and ACPI compliant power management logic. The IDE bus 126 typically supports up to four IDE devices, such as a hard disk drive 128 and a compact disk read only memory ("CD-ROM") 136. The universal serial bus 128 also may be connected to a pair of USB connectors 138 for communicating with USB devices (not shown).

The LPC bus 132 couples the south bridge 112 to a multifunction input/output ("I/O") controller 140, while the system ROM interface 130 couples a basic input/output system ("BIOS") ROM 142 to the multifunction I/O controller 140. The multifunction I/O controller 140, such as a National Semiconductor PC87417, typically includes a number of functions, such as a floppy disk drive controller for connecting to a floppy disk drive 144; a keyboard controller 146 for connecting to a keyboard 148 and a pointing device, such as a mouse 150; a serial communications controller for providing at least one serial port 152; and a parallel port interface for providing at least one parallel port 154. Alternative multifunction input/output ("I/O") controllers are manufactured by Standard Microsystems Corporation and WinBond, for example.

A video graphics controller 156 and one or more communications devices, such as a network interface controller ("NIC") 158, may be coupled to the bus 114. However, it should be noted that the video graphics controller 156 and NIC 158 may be on different bus segments that are coupled to different I/O bridges. The video graphics controller 156 may be an integrated video graphics controller, such as an ATI Radeon 7000, that supports a wide variety of memory configurations, color depths, and resolutions. Connected to the video graphics controller 156 is a frame buffer 160 (e.g. synchronous DRAM) for storing video graphics images written by the processor 100. The video graphics controller 156 may provide the graphical data to the monitor 162 and/or provide the graphical data to another system for systems without monitors. It should be understood that the frame buffer 160 stores a copy of the screen of graphical data that is delivered to the monitor 162 by the video graphics controller 156. The video graphics controller 156 "draws" the entire screen several times a second, e.g., 50-85 times a second, to create a visually persistent image that is visually responsive to the user. That is, when the processors render or otherwise change the contents of the frame buffer 160, the result is communicated to the monitor 162, and thus the user, in a relatively short time period to facilitate full motion video animation on the monitor 162.

A remote management controller 164 may be coupled to the video graphics controller 58, or the video graphics controller 156 may be integrated in the remote management controller 164. The remote management controller 164 receives graphical data that represents a portion of a video image from the video graphics controller 156. For example, the remote management controller 164 may be coupled to an output of the video graphics controller 156, to receive the digital video output ("DVO") or analog outputs signals for instance. The remote management controller 164 analyzes the graphical data for changes, compresses the changed graphical data into compressed data, encodes the compressed data into encoded data, encrypts the encoded data into processed data, and transmits the processed data. The processed data is transmitted by the NIC 158 to a remote system via the network N and/or a management network M. It should be understood that the network N and management network M may be separate networks, segmented or delineated traffic on the same physical networks (such as VLANS, for example), or a single network (e.g. where regular network traffic and management traffic take place as separate conversations on the same network).

Figure 3A:
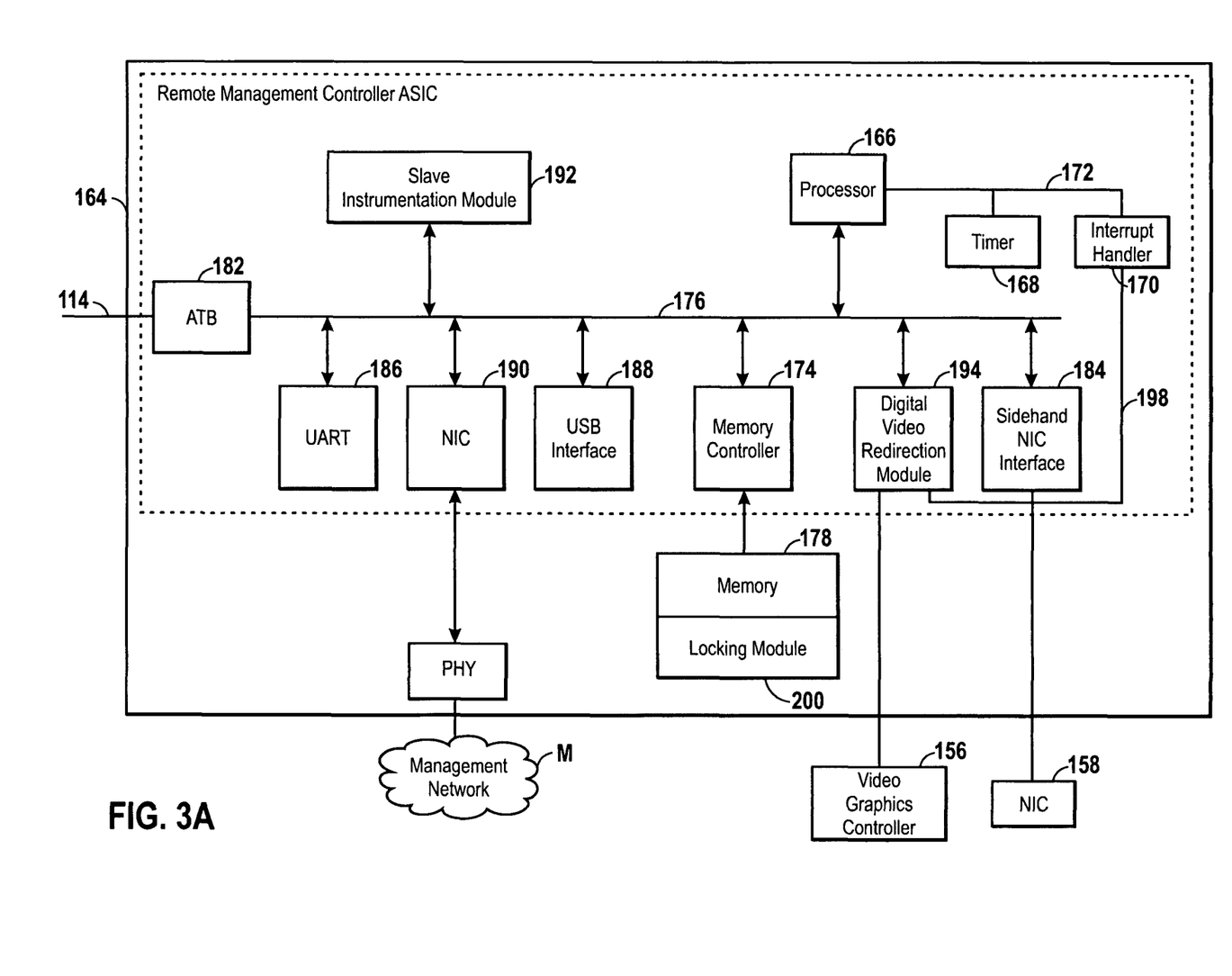
FIG. 3A illustrates a remote management controller of the managed server of FIG. 1 in accordance with an exemplary embodiment of the present invention.

Although the remote management controller 164 is illustrated as part of the managed server 20, in an alternative embodiment, the remote management controller 164 or parts of the remote management controller 164, may be separate from the managed server 20. For example, a processor 166, shown in FIG. 3, may be placed on an expansion card configured to couple with the managed server 20 via insertion into a slot 116. Additionally, for example, the remote management controller 164 may be used in a KVM switch.

The remote management controller 164, as described in more detail below, includes circuitry for obtaining graphical data from the video graphics controller 156. The remote management controller 164 may monitor the graphical data from the video graphics controller 156 to analyze the graphical data. For example, the remote management controller 164 may monitor for changes in specific portions of the graphical data. The changes in the graphical data are processed by the remote management controller 164 to compress and encode the changes for transmission to a remote system, such as the client n 76, for example.

In operation, the video graphics controller 156 provides video images in the form of graphical data to the monitor 162, as noted above. This graphical data may be provided in a variety of different resolutions, which may depend upon the settings or configuration parameters within the managed server 20. The resolution is based on a combination of the horizontal pixels and vertical pixels utilized to present the video image. This resolution may be defined by a standard, such as Video Graphics Array ("VGA"), super VGA ("SVGA"), and/or extended VGA ("EVGA"), or may be referenced by the number of pixels in each row and column utilized to present the graphical data, such as 1280×1024 or 1600×1200. For example, each pixel in the video image may represent 8 to 10 bits of color information for each CRT gun, which relates to colors, such as red, green, and blue. Accordingly, a resolution of 1600×1200 utilizes about 1.92 million storage elements for the individual pixels of the video image, which may be stored in the frame buffer 160 and transmitted as the graphical data to the monitor 162. Because the graphical data presented to the monitor 162 may be refreshed between 60-85 times per second to maintain the video images on the monitor 162, the graphical data may consume a large amount of storage elements and bandwidth. Techniques have been developed to efficiently provide the graphical data to a remotely located computer for remote management of the managed server 20.

Turning to FIG. 3A, a functional block diagram of an exemplary embodiment of a remote management controller 164 of FIG. 2 is illustrated. All or a portion of the remote management controller 164 may be implemented in a single application specific integrated circuit ("ASIC"). Alternatively, the remote management controller 164 may be implemented in a plurality of integrated circuits or discrete components. Those skilled in the art will appreciate that implementation details, such as deciding which functional aspects of remote management controller 164 are implemented in a single ASIC or different ASICs, are matters of design choice.

The remote management controller 164 may be communicatively coupled with various portions of the server 20, as shown, but is generally independent from the managed server 20. In particular, the remote management controller 164 does not operate under the control of the processor 100, the memory 104, etc., of the managed server 20. In one embodiment, the remote management controller 164 may be located on an expansion card or an add-in card which is coupled to the motherboard of the managed server 20 via slots 120. In accordance with an alternative embodiment, the remote management controller 164 may be implemented using a single ASIC, which may be incorporated into the motherboard of the managed server 20. In yet another embodiment, the remote management controller 164 may be a self-contained internal or external unit coupled directly to one or more components of the managed server 20.

Figure 3B:
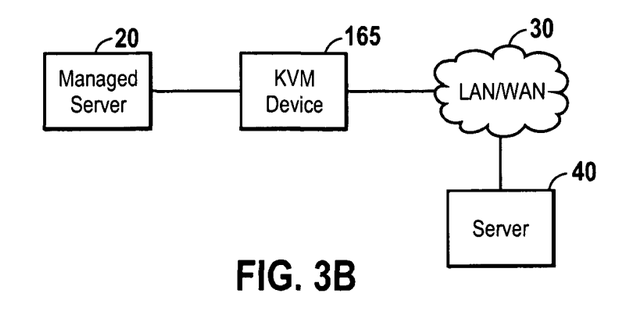
FIG. 3B illustrates a keyboard+video+mouse device that may be used to provide security functions to managed server in accordance with an exemplary embodiment of the present invention.

Additionally, in accordance with an alternative exemplary embodiment illustrated in FIG. 3B, a keyboard+video+mouse (KVM) device 165, such as a KVM dongle, for example, may be used to provide security for the managed server 20. The KVM device 165 may be external to the managed server 20, as illustrated. Additionally, in accordance with an exemplary embodiment, the KVM device 165 may be configured to allow for remote management of the managed server 20 in addition to providing security functions described herein for the managed server 20. As such, the KVM device 165 may replace the remote management controller 164 for the purposes of remote management of the managed server 20.

The remote management controller 164 allows for any remote system to connect directly or indirectly to the managed server 20 by establishing communication with the remote management controller 164 through a network connection, as is more fully described below. Users may further interface with the remote management controller 164 through additional communications interfaces such as a modem, for example.

The remote management controller 164 may be implemented so that it is powered and capable of operation regardless of whether the managed server 20 is powered up or online. The independent powering of the remote management controller 164 allows the remote management controller 164 to monitor, analyze and potentially intervene to correct a wide range of system issues that may befall the managed server 20 when it is not powered.

The remote management controller 164 may include various logic components to provide interaction with the managed server 20. For instance, a processor 166 may provide general control and functions as a management processor for the remote management controller 164. The processor 166 is dedicated to remote access function and, as mentioned above, is independent from the processor 100 and other processors that may be operating on the server 20. Because of the additional processing power provided by the processor 166, the server 20 may be provided with enhanced remote applications such as, for example, secure connections, multiple sessions, in-band connectivity, et cetera, without having to divert the processing power of other processors associated with the server 20. Additionally, since the remote management controller 164 is independent of the host OS, a system administrator can bring the operating system up or down, or even reset the server 20, through either an in-band or out-of-band connection with a remote terminal. The processor 166 may be implemented as a 32-bit RISC processor, but other processor implementations may be employed as well. The processor 166 is shown in this example as being operatively coupled to a timer module 168 and an interrupt controller 170 via a bus 172.

In the present embodiment, a memory controller 174 is operatively coupled to an internal local bus 176. The memory controller 174 is operatively coupled to a memory 178 which may represent a variety of memory types serving various functions within the remote management controller 164. Specifically, the memory 178 may be representative a plurality of memory modules or memory devices and may include dynamic random access memory (DRAM), synchronous random access memory (SRAM), non-volatile random access memory (NVRAM), flash memory, electrically erasable and programmable read-only memory (EEPROM), erasable and programmable read-only memory (EPROM), and/or programmable read-only memory (PROM).

The processor 166 is configured to run software stored on the memory 178 to facilitate the remote access of the managed server 20. The remote management controller 164 may also be configured to provide status data, referred to as hardware status data, a remote manager, such as client n 76. The remote management controller 164 may also be configured to receive commands or instructions from the client n 76 and to transmit these commands or instructions to the managed server 20 or other suitable components of the managed server 20. Thus, the remote management controller 164 facilitates remote diagnosis and servicing of the managed server 20. Additionally, as will be described in greater detail below, the remote management controller 164 may be configured to generate keyboard sequence commands to lock the operating system of the managed server 20 to prevent a local console 80 from hijacking the managed server 20 if the connection to a managing remote client is invalid.

The processor 166 may be operatively coupled to the other functional modules (and possibly many sub-modules) of the remote management controller 164 via the internal local bus 176. Those of ordinary skill in the field will appreciate that the internal local bus 176 exists to allow communication between and among the logical components of the remote management controller 164. For instance, an address translation and bridging ("ATB") unit 182 is operatively coupled to the internal local bus 176 and to a PCI bus 114, which is discussed above. The ATB unit 182 provides access to the PCI bus 114 for the different logic components of the remote management controller 164. Also, a sideband NIC interface 184 may be utilized to communicate with the NIC 158 so that management traffic can flow through the network N.

Further, the remote management controller 164 may include communication interfaces that can be employed to establish out-of-band communication sessions for the remote management controller 164. One such communication interface is a UART interface module 186, which is operatively coupled to the internal local bus 176. The exemplary UART interface module 186 comprises two standard 16550 UARTs, each of which may provide a separate serial communication interface via an RS-232 interface or the Intelligent Chassis Management Bus ("ICMB") interface. Another such communication interface is a USB interface 188, which is operatively coupled to the internal local bus 176. The USB interface 188 may be coupled to a USB host controller (not shown). Further, a Network Interface Controller ("NIC"), which is operatively coupled to the internal local bus 176, provides another external communication interface between the remote management controller 164 and remote systems coupled to the Management Network M, which is discussed above. The NIC 158 may include a MAC ("Media Access Controller"), inbound and outbound first-in first-out buffers ("FIFOs"), a DMA engine to transfer packets automatically to and from memory, and an external PHY and typical magnetics and connectors to couple the physical connection ("PHY") to the wire that serves as the transmission media.

To control and monitor functions in the managed server 20, a slave instrumentation module 192 may be utilized. The slave instrumentation module 192 may include an automatic server recovery ("ASR") controller that operates to respond automatically to catastrophic failures of the managed server 20 and a general purpose input/output module ("GPIO") that provides a versatile communication interface. A JTAG master may also be utilized to perform a wide range of control functions on the managed server 20. Further, an $I^2C$ master may be utilized to control a plurality of independent $I^2C$ serial channels. The slave instrumentation module 192 may also include system support logic to provide a variety of housekeeping and security functions for the managed server 20, such as providing the system identification ("ID"), flash ROM support, error correction code ("ECC") support, hot spare boot support, system post monitor support, floppy write protect, SMI base security measures, open hood detection and the like.

The remote management controller 164 is adapted to receive outputs from the video graphics controller 156. As described in detail below, the digital video redirection module 194 may be configured to receive output signals from the video graphics controller 156. The digital video redirection module 194 may be coupled to one of the outputs, e.g., the DVO, of the video graphics controller 156. The components of the digital video redirection module 194 may modify these output signals to provide the processed graphical data to a remote system via the NIC 190. Also, the digital video redirection module 194 may be coupled to the interrupt handler 170 via a bus 198 to interact with the processor 164 which processes the graphical data.

As discussed above, the remote management controller 164 allows for remote access to the managed server 20. For example, client n 76 of FIG. 1 may access the managed server 20 over the network N and/or the management network M. Although not shown, it should be understood that the client n 76 may be coupled to the managed server 20 via any of a number of possible connection paths. For example, the client n 76 may access the server 20 via server 70, Internet 60, server 50, server 40, and LAN/WAN 30, as shown in FIG. 1. Once a connection is established between the client n 76 and the managed server 20, the client n 76 can access the managed server 20 and perform management tasks and operations on the managed server 20. Additionally, it should be understood that any client computer may be used to remotely access and manage the managed server 20 as long as a user is able to provide the authentication information required to access the managed server 20.

In addition to a remotely located client accessing the managed server 20, such as the client n 76 for example, a user at the managed server 20 may use the keyboard 148, the mouse 150 and the monitor 162 of the managed server to access the managed server 20. Collectively, the keyboard 148, the mouse 150 and the monitor 162 (as well as other possible user interface devices) serve as a local console to the managed server 20 and may be referred to as a local console. Alternatively, an independent computer system, such as a notebook computer, may couple directly to the managed server 20, in which case, the independent computer may be considered a local console for the managed server.

The managed server 20 may be serviced remotely by a user on the client n 76 or locally by a user using a local console. As discussed above, when the remote user accesses the managed server 20, for example via the client n 76, a user at the local console may also gain access to the managed server 20. Stated differently, when the client n 76 unlocks the operating system of the managed server 20, providing appropriate authentication credentials, the operating system of the managed server 20 may also be unlocked for a user at the local console and the user at the local console may hijack the managed server 20. Procedures, however, may be implemented to thwart the hijacking, as will be discussed in detail below.

The remote management controller 164 includes a locking module 200 which may be a program stored in the memory 178 of the remote management controller 164. The locking module 200 may remain dormant or inactive during normal operation of the managed server 20. However, when the remote management controller 164 detects that a remote management session is being initiated (with client n 76, for example), the remote management controller 164 activates the locking module 200. The detection of initiation of a remote management session may be accomplished by monitoring activity of a network port such as the NIC 158, for example, to determine when a remote user is attempting to log into or gain access to the managed server 20.

When activated, the locking module 200 is configured to monitor the connection with the remote manager, such as client n 76. If the connection becomes invalid for any reason, management trap causes a command to issue that locks the operating system of the managed server 20. The locking of the operating system blocks a user at the local console from gaining unauthorized access to the managed server 20.

The generated command to lock the operating system of the managed server 20 may be a virtual keyboard sequence or "shortcut sequence." Specifically, upon determining that the connection with the remote manager has become invalid, the locking module 200 may issue a signal that is recognized by the operating system as a series of keystrokes indicating a locking operation should occur. In particular, the virtual keyboard sequence may be a series of bits recognized by the operating system running on the managed server 20 as a particular command to lock or prevent use of the managed server. Because different operating systems may recognize different keystrokes as indicating the same or similar function the particular virtual keyboard sequence issued may be specific to the particular operating system being run by the managed server 20.

A variety of possible keyboard sequences are available to effectuate a locking response by the operating system. For example, in a Windows operating system, a virtual keyboard sequence such as "Windows key+L" may be used. Alternatively, the operating system may be locked by issuing the virtual keyboard sequence "CTRL+ALT+DEL+K". In a LINUX environment, a carrier detect signal can be deasserted consequently sending a hang up signal (HUP) to end the remote management session and prevent another user from continuing the session.

It should be understood that alternate programmable keyboard sequences or macros may also be implemented and may be suited to the particular operating system that running on a managed server 20. Additionally, mouse-based operations may also be used to prevent access to the managed server 20. For example, "click lock console" may be used. For token-based authentication systems, a "disconnect smart card" may be implemented to prevent access.

In yet another alternative embodiment, other operations may be used for securing the managed server. For example notification to an operating system via an application that is contacted by the management processor in the event communication with a remote manager is lost. The application may be configured to react to a "disconnect assertion" or a "timeout" signal. The use of the application for notification may allow for additional functions to be performed. The application may secure the managed server 20 by activating a screen saver. The screen saver may be password protected to help ensure that only a credentialed user knowing the password would be able to gain access to the managed server 20 via the local console. The use of the application to secure the managed server 20 may, however, require additional software and, possibly, additional cost.

The use of the management traps for locking of the operating system, as discussed above, is effective for preventing a user at the local console from gaining access to the managed server 20 after a remote user has logged in to the managed sever but subsequently has lost a connection with the managed server 20. However, the use of management traps for such security purposes does have limits. For example, even if the management traps are effective to lock the operating system, the user at the local console may be able to regain access independent from the remote user/manager by entering valid credentials. Of course, in such an instance, the user at the local console would have been able to gain access independent from the remote user/manager anyway.

Figure 4:
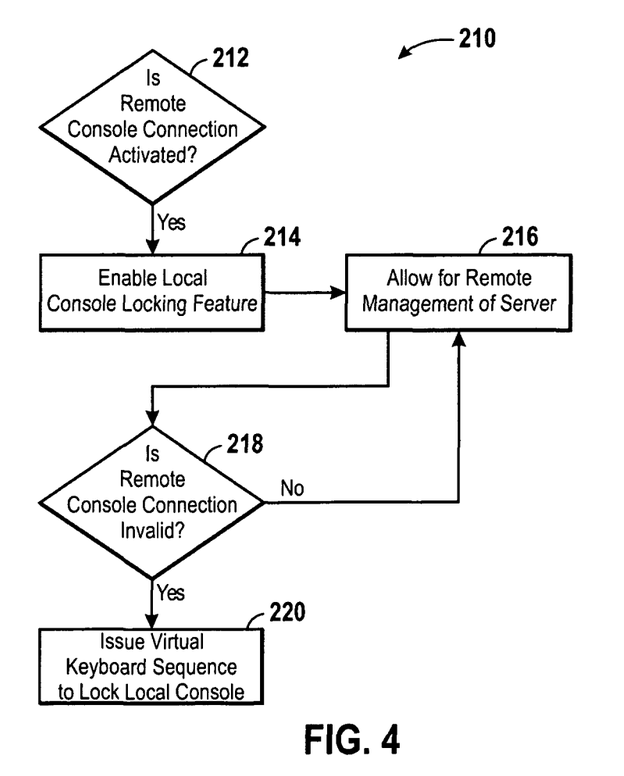
FIG. 4 illustrates a flow chart of a technique to prevent access to a server by a local console in accordance with an exemplary embodiment of the present invention.

A flow chart illustrating the operation of the managed server 20 is illustrated in FIG. 4 and referred to by the reference numeral 210. Initially, it is determined if a remote management connection is activated, as indicated at block 212. This determination may be made by the processor 166 of the remote management controller 164. If the remote management connection is activated, the locking module 200 is enabled, as indicated at block 214. Once the locking module 200 is enabled, remote management of the managed server 20 is allowed, as indicated at block 216.

During remote management of the managed server 20, the remote console connection is monitored to determine if the connection is invalid, as indicated at block 218. As mentioned above, invalid connections can be attributed to time out, loss of network link, a reset of the management processor, or other conditions or causes.

If it is determined that the remote console connection remains valid, remote management of the server continues, as indicated. However, if for some reason the remote console connection is determined to be invalid, the locking module 200 locks the operating system of the managed server 20, as indicated at block 220, to prevent hijacking of the managed server 20. The remote management connection may become invalid for a variety of reasons, as discussed above.

The advantages of implementing the techniques disclosed herein, may include, but are not limited to, enabling console security via management traps and enabling security for remote management connection loss. Additionally, there is no requirement for supplemental on-board software or drivers. As such, the techniques are cost effective and may be implemented with minimal changes to the manufacturing process.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for remote system management comprising:
establishing a connection between a remote console and a managed server, the managed server comprising a management controller, in which the management controller is operated independent of the managed server; and
with the management controller:
detecting a change in the status of the connection; and
issuing commands to the managed server to lock the managed server using management traps if a change in the status of the connection is detected.

2. The method of claim 1, wherein establishing a connection with a managed server comprises receiving credentials to login to an operating system of the managed computer.

3. The method of claim 1, wherein detecting a change in status of the connection comprises detecting that the connection is invalid.

4. The method of claim 1, wherein detecting a change in the status of the connection comprises detecting that the connection is abandoned.

5. The method of claim 1, wherein detecting a change in the status of the connection comprises detecting that the connection is disconnected.

6. The method of claim 1, wherein using a management trap comprises generating a virtual keyboard sequence.

7. The method of claim 6 wherein the virtual keyboard sequence is the Windows key and the L key to lock the local console.

8. The method of claim 6 wherein generating a virtual keyboard sequence comprises generating a keyboard shortcut of "CTRL_ALT_DEL" and the K key" to lock the operating system of the managed server.

9. The method of claim 6 wherein in generating a keyboard shortcut comprises activating a screensaver on the managed server that requires a password to deactivate.

10. The method of claim 1, wherein issuing commands to lock the managed server comprises running a macro.

11. The method of claim 1, wherein issuing commands to lock the managed server comprises initiating a programmable keyboard sequence to lock the managed server.

12. A computer system comprising:
a managed computer system comprising:
a central processing unit;
a memory accessible by the central processing unit; and
a plurality of peripheral devices operably coupled to the computer system; and
an independently operative management controller communicatively coupled to the managed computer system comprising:
a processor; and
memory coupled to the processor,
in which the management controller:
allows a remote user to manage the managed computer;
monitors a communication link between the remote user and the managed computer; and
issues a command to prevent access to the managed computer if the management controller determines that the communication link is invalid.

13. The system of claim 12, wherein the command to prevent access to the computer comprises the use of virtual keystrokes to initiate management traps.

14. The system of claim 13, wherein the command to prevent access to the computer comprises a virtual keystroke of CTL_ALT_DEL and the K key.

15. The system of claim 13, wherein the command to prevent access to the computer comprises a virtual keystroke of the Windows key and the L key.

16. The system of claim 12, wherein the management controller comprises a locking module.

17. The system of claim 16, wherein the locking module is activated if a remote user attempts to access the computer.

18. The system of claim 16, wherein the locking module is inactive if there is no remote access established with the computer.

19. The system of claim 16, wherein the locking module is configured to initiate virtual keystrokes to initiate management traps.

20. The system of claim 12, wherein issuing a command to prevent access to the managed computer comprises issuing a mouse-based command.

21. The system of claim 12, wherein issuing a command to prevent access to the managed computer comprises launching an application configured to activate a screen saver.

22. The system of claim 21, wherein the screen saver is password protected.

23. A non-transitory tangible machine readable medium comprising:
- code, stored in the non-transitory tangible machine readable medium, to provide a remotely located user management access to a managed server, the managed server comprising a management controller that is operated independent of the managed server;
- code, stored in the non-transitory tangible machine readable medium, to monitor a communication link associated with the remotely located user's access to the managed server;
- code, stored in the non-transitory tangible machine readable medium, to determine whether the communication link becomes invalid, wherein if the communication link is determined to be invalid, access to the managed server is terminated via a management trap issued by the management controller communicatively coupled to the managed server; and
- code, stored in the non-transitory tangible machine readable medium, to, with a locking module of the management controller, lock the managed server.

24. The program of claim 23, wherein the code to provide the remotely located user management access to the server comprises requiring authentication information from the remotely located user and wherein once the access to the server is terminated via a management trap, re-authentication is required to gain access to the server.

25. The program of claim 23, wherein terminating access to the server via a management trap comprises issuing a virtual keystroke to lock an operating system running on the server.

* * * * *